United States Patent [19]
Brant et al.

[11] Patent Number: 5,594,990
[45] Date of Patent: Jan. 21, 1997

[54] LAWN TRIMMING AND EDGING APPARATUS HAVING MOTOR HOUSING ROTATABLE ON EXTENDABLE HANDLE

[75] Inventors: Ronald G. Brant, Haughton; Michael S. Houge, Shreveport, both of La.

[73] Assignee: WCI Outdoor Products, Inc., Cleveland, Ohio

[21] Appl. No.: 391,145

[22] Filed: Feb. 21, 1995

Related U.S. Application Data

[63] Continuation-in-part of Ser. No. 96,483, Jul. 22, 1993, Pat. No. 5,446,964.

[51] Int. Cl.⁶ .................................................... A01D 50/00
[52] U.S. Cl. .................................... 30/122; 30/276; 172/14
[58] Field of Search ........................... 30/276, 122, 277.4, 30/264; 172/14; 56/12.7

[56] References Cited

U.S. PATENT DOCUMENTS

| | | |
|---|---|---|
| D. 161,109 | 12/1950 | Keiper . |
| D. 251,699 | 5/1979 | Averitt . |
| D. 301,009 | 5/1989 | Pilatowicz et al. . |
| D. 308,003 | 5/1990 | Kraynyk . |
| 942,490 | 12/1909 | Dunn . |
| 2,149,463 | 3/1939 | Orr ............................................. 30/264 |
| 2,608,043 | 8/1952 | Berdan ................................ 30/DIG. 5 |
| 2,641,012 | 6/1953 | Storrs . |
| 2,722,095 | 11/1955 | Farney . |
| 2,756,555 | 7/1956 | Lewis . |
| 3,330,102 | 7/1967 | Shuman . |
| 3,561,199 | 2/1971 | Lay . |
| 3,680,639 | 8/1972 | Davis ........................................ 30/264 |
| 3,693,255 | 9/1972 | Langenstein . |
| 3,803,819 | 4/1974 | Ehrlich . |
| 3,831,278 | 8/1974 | Voglesonger . |
| 3,861,127 | 1/1975 | Riturns . |
| 3,959,879 | 6/1976 | Sellers . |
| 4,007,526 | 2/1977 | Langenstein . |
| 4,043,101 | 8/1977 | Lahr et al. . |
| 4,049,059 | 9/1977 | Weibling . |
| 4,052,789 | 10/1977 | Ballas . |
| 4,062,114 | 12/1977 | Luick . |
| 4,156,312 | 5/1979 | Ballas . |
| 4,156,967 | 6/1979 | Ballas . |
| 4,202,094 | 5/1980 | Kalmar . |
| 4,205,439 | 6/1980 | Sweet . |
| 4,238,866 | 12/1980 | Taylor . |
| 4,268,964 | 5/1981 | Moore . |
| 4,282,652 | 8/1981 | Ballas, Sr. . |
| 4,338,719 | 7/1982 | Burkholder . |
| 4,360,971 | 11/1982 | Fellmann . |
| 4,463,498 | 8/1984 | Everts . |
| 4,550,499 | 11/1985 | Ruzicka . |
| 4,578,863 | 4/1986 | Laverick . |
| 4,603,478 | 8/1986 | Anderson . |
| 4,641,431 | 2/1987 | Leming et al. . |
| 4,654,971 | 8/1987 | Fettes et al. . |
| 4,760,646 | 8/1988 | Seigler . |
| 4,829,675 | 5/1989 | Beihoffer . |
| 4,848,846 | 7/1989 | Yamada et al. . |
| 4,860,451 | 8/1989 | Pilatowicz et al. . |
| 4,894,914 | 1/1990 | Mead . |
| 4,916,818 | 4/1990 | Panek . |
| 4,924,573 | 5/1990 | Huddleston . |
| 4,944,711 | 7/1990 | Hironaka et al. . |
| 4,976,031 | 12/1990 | Miller . |
| 4,991,298 | 2/1991 | Matre . |
| 5,029,435 | 7/1991 | Buchanan . |
| 5,228,276 | 7/1993 | Miller . |
| 5,446,964 | 9/1995 | Woods et al. ............................ 30/277.4 |

*Primary Examiner*—Kenneth E. Peterson
*Attorney, Agent, or Firm*—Marc A. Hubbard; Winstead Sechrest & Minick P.C.

[57] ABSTRACT

A powered lawn and garden tool for trimming and edging lawns is specially adapted for shipping and storing in collapsed state for reduced package sizes includes a single length of tube that is received within an extended neck portion of a motor housing. During final assembly, the tube is extended and locked into position in a single motion. The housing is further adapted to be rotated one hundred eighty degrees on the tube when it is extended and includes a button-operated mechanism for releasing the tube for rotation and locking it in either of two positions, one hundred eighty degrees apart.

15 Claims, 6 Drawing Sheets

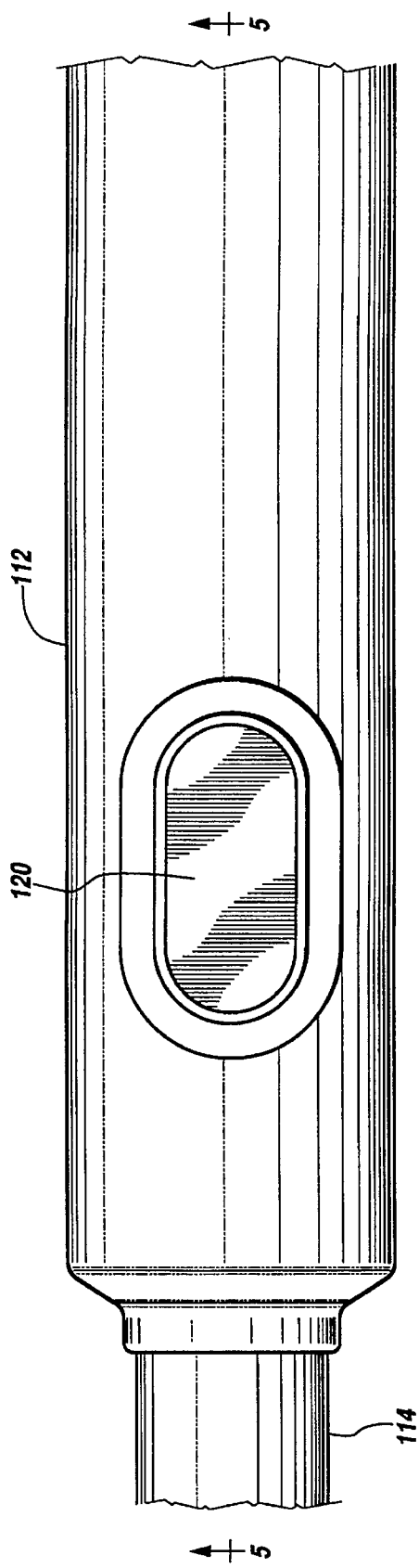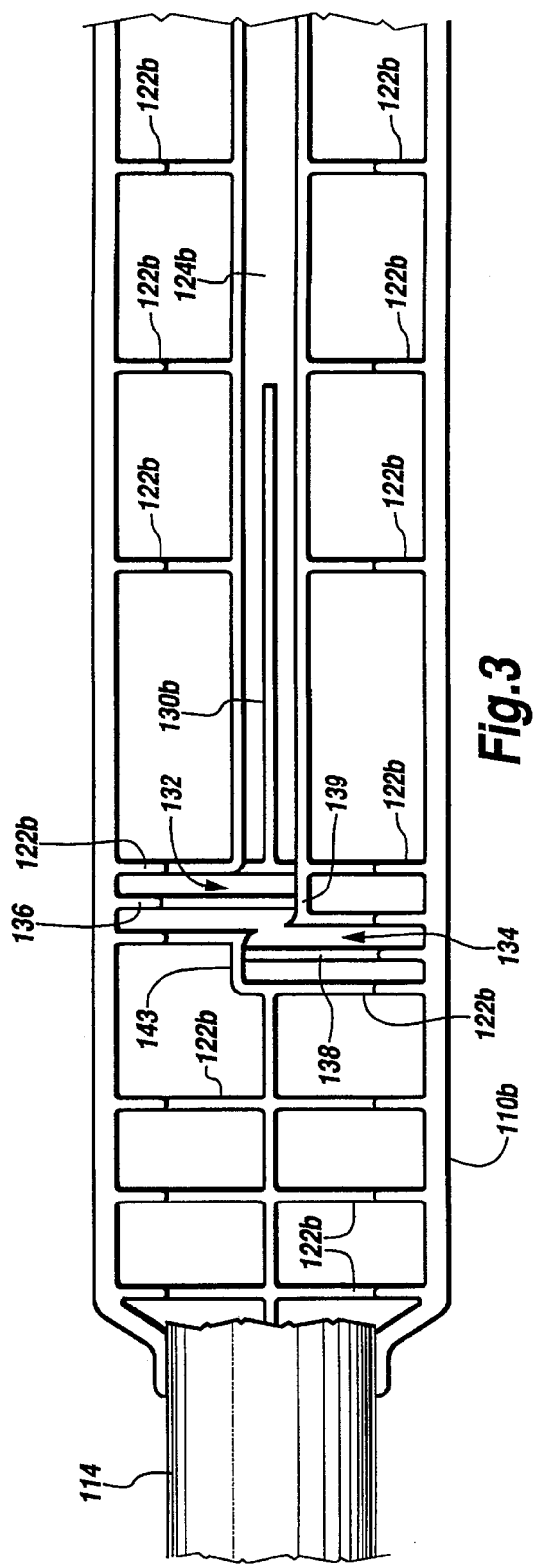

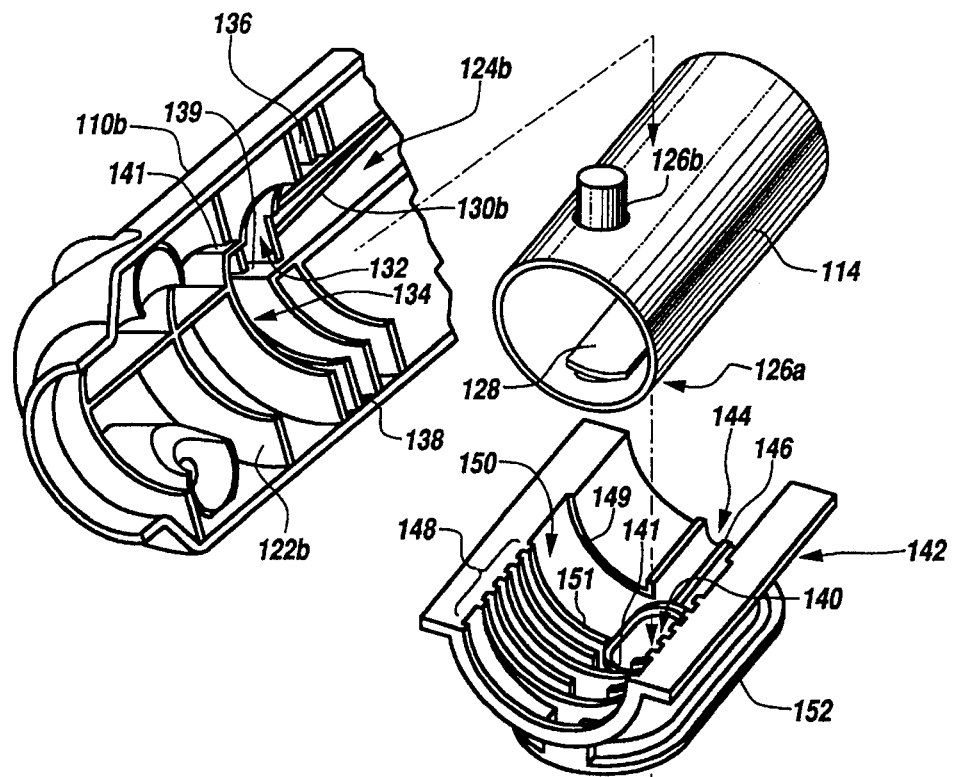
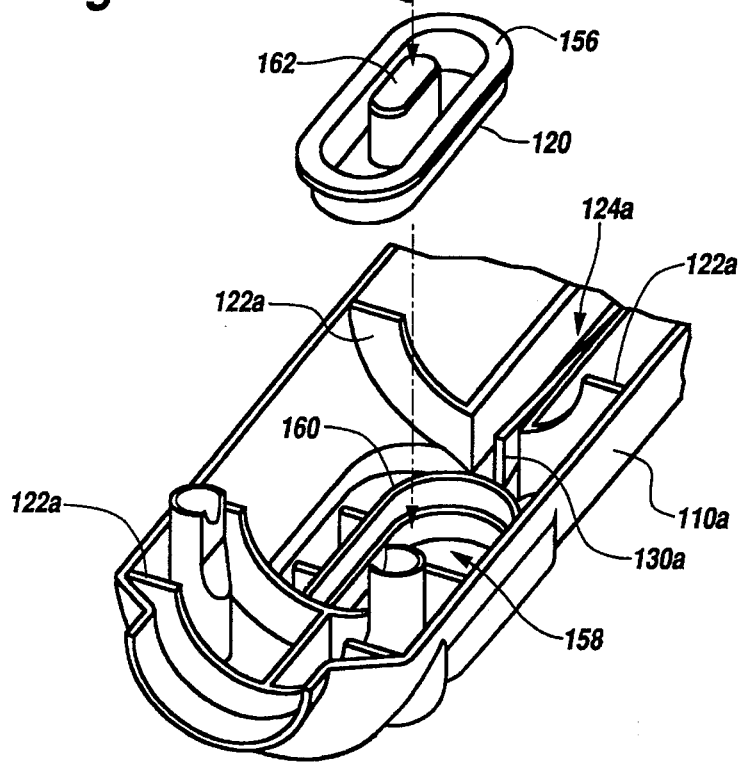
Fig.4

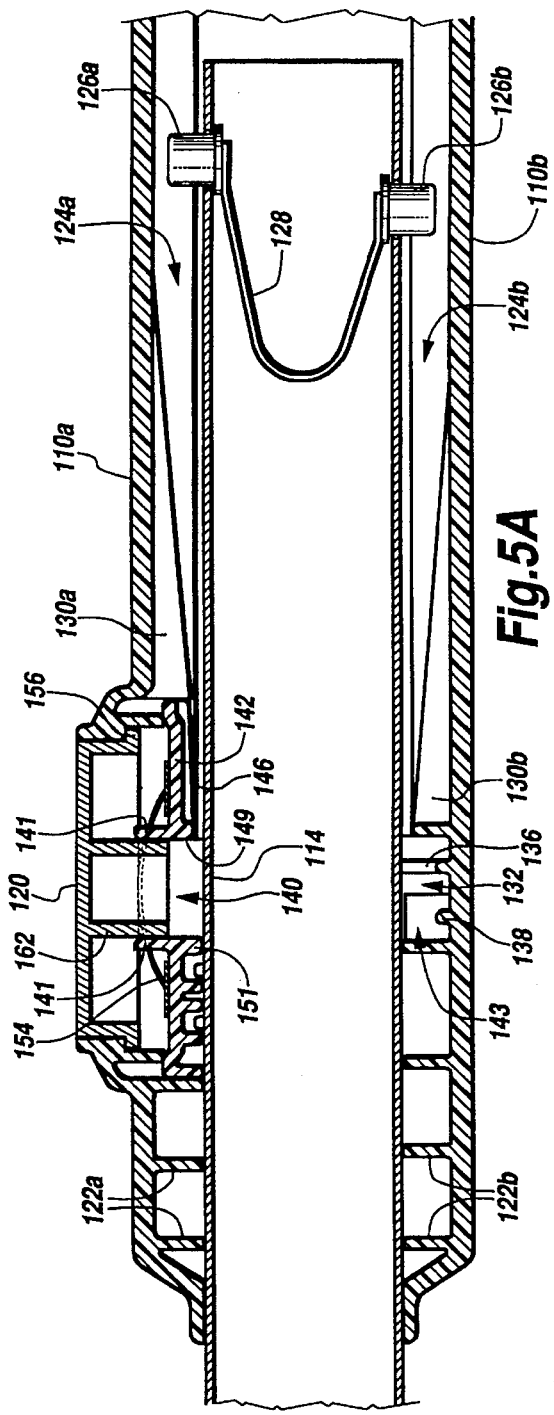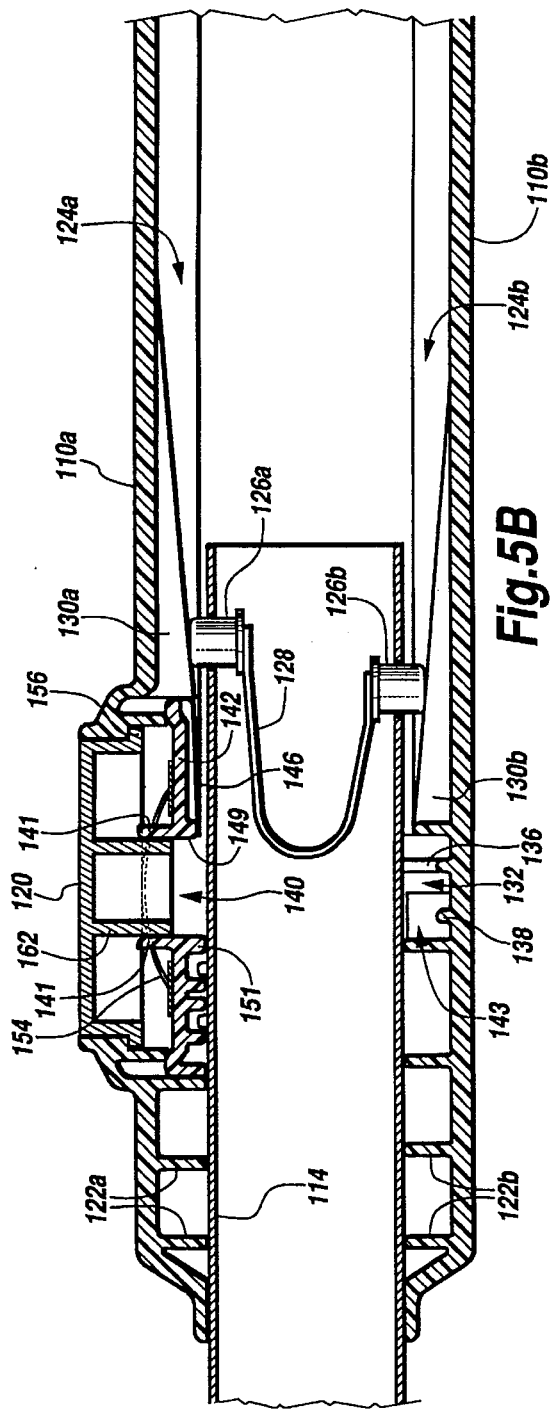

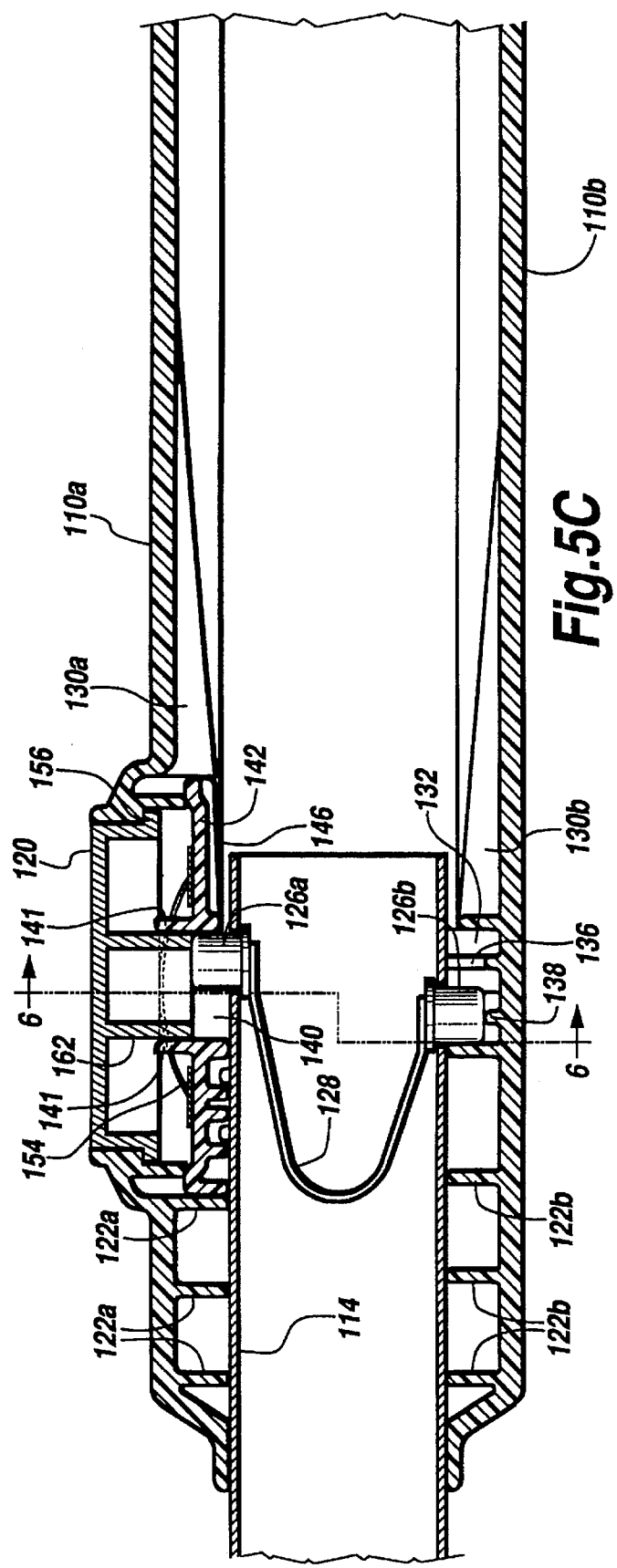

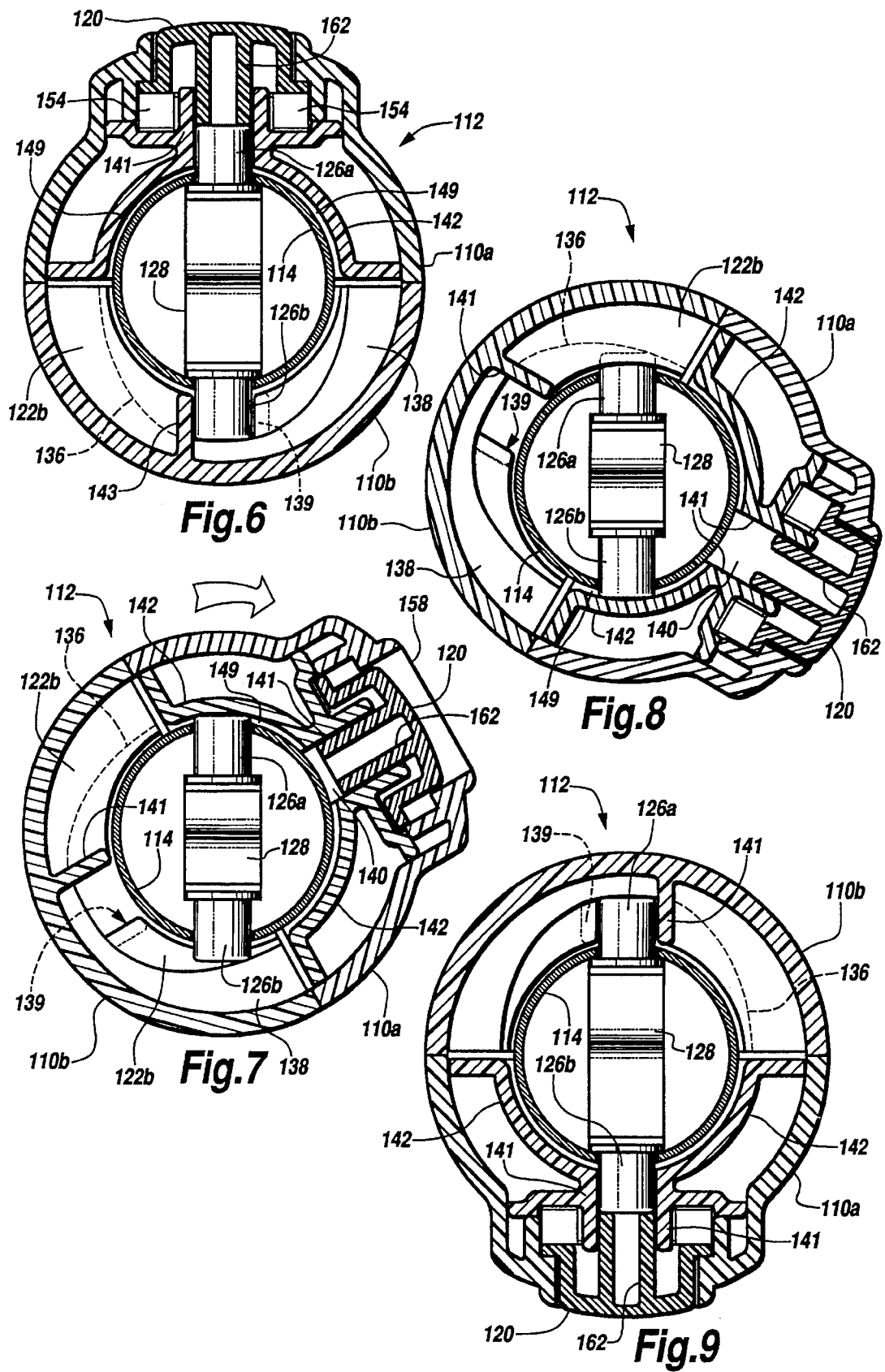

LAWN TRIMMING AND EDGING APPARATUS HAVING MOTOR HOUSING ROTATABLE ON EXTENDABLE HANDLE

This application is a continuation-in-part of U.S. Ser. No. 08/096,483, filed Jul. 22, 1993, now U.S. Pat. No. 5,446,964 which application is incorporated herein for all purposes by reference.

FIELD OF INVENTION

The invention relates to hand-held lawn trimmers.

BACKGROUND OF THE INVENTION

Hand-held lawn trimmers such as flexible line trimmers have become very popular and widely used by homeowners to cut soft ground vegetation in areas that are inaccessible with conventional lawn mowers. The cutting element is most often a length of flexible line that is spun rapidly by a "line head" and flails the vegetation. Flexible line is comparatively safe, tends not to cause damage to structures and trees and, if the line becomes damaged, is inexpensively and easily replaced. For tougher vegetation, a rigid blade is sometimes used in place of the line head.

A typical lawn trimmer is formed from an elongated tube, a rotating cutting element mounted on a lower end of the tube and a handle attached to an upper end of the tube for enabling an operator, while standing, to position the cutting element adjacent and parallel to the ground. An auxiliary handle for the operator's other hand can be attached lower on the tube, between the main handle and the cutting element to enhance control.

In an electrically-powered trimmer, the cutting dement is mounted directly to a shaft of an electric motor mounted within a protective housing that is clamped around the lower end of the tube. Power is delivered to the motor by a 120 volt alternating current or by direct current from a battery. The battery is preferably mounted on the upper end of the elongated tube, opposite the motor, for better balance. With either power source, electrical wiring for supplying power generally runs through the elongated tube, between the electric motor in the housing and a trigger switch on the handle. An operator controls delivery of power to the motor with the trigger switch. For safety, electric trimmers must be "prewired" during manufacture by attaching the wires to both the switch in the handle and the electric motor and running the wires through the tube before packaging and shipment.

Having the wire running through the tube gives rise to several problems. Consumers frequently use lawn trimmers to cut an edge along the side of lawn. Because the handles are configured for holding the cutting element parallel to the ground, the operator must turn the trimmer over and hold it in an unwieldy manner so that the cutting element is perpendicular to the ground. To facilitate use of a trimmer as an edger, the housing of some trimmers is attached to the tube in a manner that permits it to be rotated about the tube. These trimmers are sometimes provided with a button on the exterior of the housing that operates a lock for preventing rotation of the housing on the tube. Depressing the button releases the lock and permits the housing to be rotated. However, continued rotation of the housing in one direction will twist the wire, straining the electrical connections with the motor or the trigger switch.

Electric flexible line trimmers are sometimes packaged and shipped in a "knocked down" or partially disassembled state. Traditionally, to knock down the trimmer the tube that supports the handles is manufactured in two or more sections that are separated and folded over when placed in a box. In other cases the tube may be manufactured as a single piece but not attached to the motor housing, the main handle or both to save space. An extra length of electrical wire is sometimes necessary to allow the tube pieces to be pulled apart and folded over and to prevent the end of each piece from rubbing against the wire during shipment. The trimmer may be damaged as a result of a consumer assembling the handle portions in a rough manner or forcing the extra wire into one or both tube halves.

Furthermore, although of considerable benefit in terms of cost of shipping and storage to those who sell trimmers, consumers find assembling a knocked down line trimmer to be a nuisance and an inconvenience. The electrical wires make assembly more frustrating. The end of one tube section, having a smaller diameter, slides into the larger diameter end of the other tube length and bolts inserted at the joint to secure the two sections. Proper orientation of the upper length of tube length with the lower length is frequently overlooked by first time buyers and is not discovered until after bolts are installed to secure the tube lengths, thus causing frustration and discontent. Furthermore, the consumer is faced with the tedious task of forcing the extra length of wire, which is relatively stiff, into one or both tube sections when attempting to bring them together.

SUMMARY OF THE INVENTION

The invention relates to a lawn trimmer having an improved, button-operated mechanism for fixing rotation of a motor housing on a handle support tube at either a trimming position or an edging position.

According to one aspect of the invention, the button-operated mechanism is specially adapted for further accommodating extension of tube from the housing for one-step assembly from a collapsed or knocked-down state. The trimmer may be assembled in a single movement, without tools, missteps or interference from the electrical wiring running through the tube. The invention thus provides for a lawn trimmer that has enhanced maneuverability and control during edging operations and also eliminates the inconvenience and problems to a purchaser of assembling a line trimmer knocked-down for packaging.

According to another aspect of the invention, the button-operated mechanism is adapted to prevent excessive twisting of a power cord extending through the tube by limiting relative rotation of the tube and housing to within a fixed angle. Stress on the power cord and its connections is thus minimized.

In a preferred embodiment of the invention, one end of an elongated handle support tube is inserted into a specially adapted and extended neck of a lower housing enclosing an electric motor. The tube is pulled linearly from the housing and locked into an operating position in a single movement. Two detent buttons extending from the tube cooperate with the housing to limit further lateral movement of the tube once extended and to fix the relative rotational position of the housing and tube in either a trimming or an edging position. One detent cooperates with a button on the outside of the housing to hold the housing on the tube in a trimming orientation. The other detent cooperates with the button-operated mechanism in the housing to hold it in an edging orientation. Pressing the button releases the detent in engagement with the button and permits relative rotation of the housing and the tube between the trimming and edging orientations. The housing includes rotational guides for two detent buttons that permit rotation only within a fixed angle between the trimming an edging positions and prevent further linear movement of the tube with respect to the housing.

These and further aspects and advantages of the invention are described in connection with a preferred embodiment of the invention illustrated by the appended drawings.

BRIEF DESCRIPTION OF THE DRAWINGS

FIG. 2 is a side elevation of a section of an extended neck portion of an electric motor housing of a line trimmer.

FIG. 3 is a side view of the neck of the electric motor housing of FIG. 2 with one half of the neck removed and a portion of a handle supporting tube removed.

FIG. 4 is an exploded view of a button-operated lock for fixing rotation of the motor housing to a handle support tube.

FIG. 5A is cross-section of the neck of the housing of FIG. 2, taken along section line 5—5, with a handle support tube received partly therein in a collapsed position.

FIG. 5B is cross-section of the neck of the housing of FIG. 2, taken along section line 5—5, showing the handle support tube in a partly extended position.

FIG. 5C is cross-section of the neck of the housing of FIG. 2, taken along section line 5—5, with a handle support tube shown in a fully extended position.

FIG. 6 is a cross-section of the neck of the housing taken along section line 6—6 of FIG. 5C.

FIG. 7 is the cross-section of FIG. 6 with the housing rotated clockwise approximately forty-five degrees on the handle support tube.

FIG. 8 is the cross-section of FIG. 6 with the housing rotated clockwise approximately one hundred twenty-five degrees on the handle support tube.

FIG. 9 is the cross-section of FIG. 6 with the handle rotated clockwise one hundred eighty degrees on the handle support tube.

DETAILED DESCRIPTION OF THE PREFERRED EMBODIMENT

Figure 1:
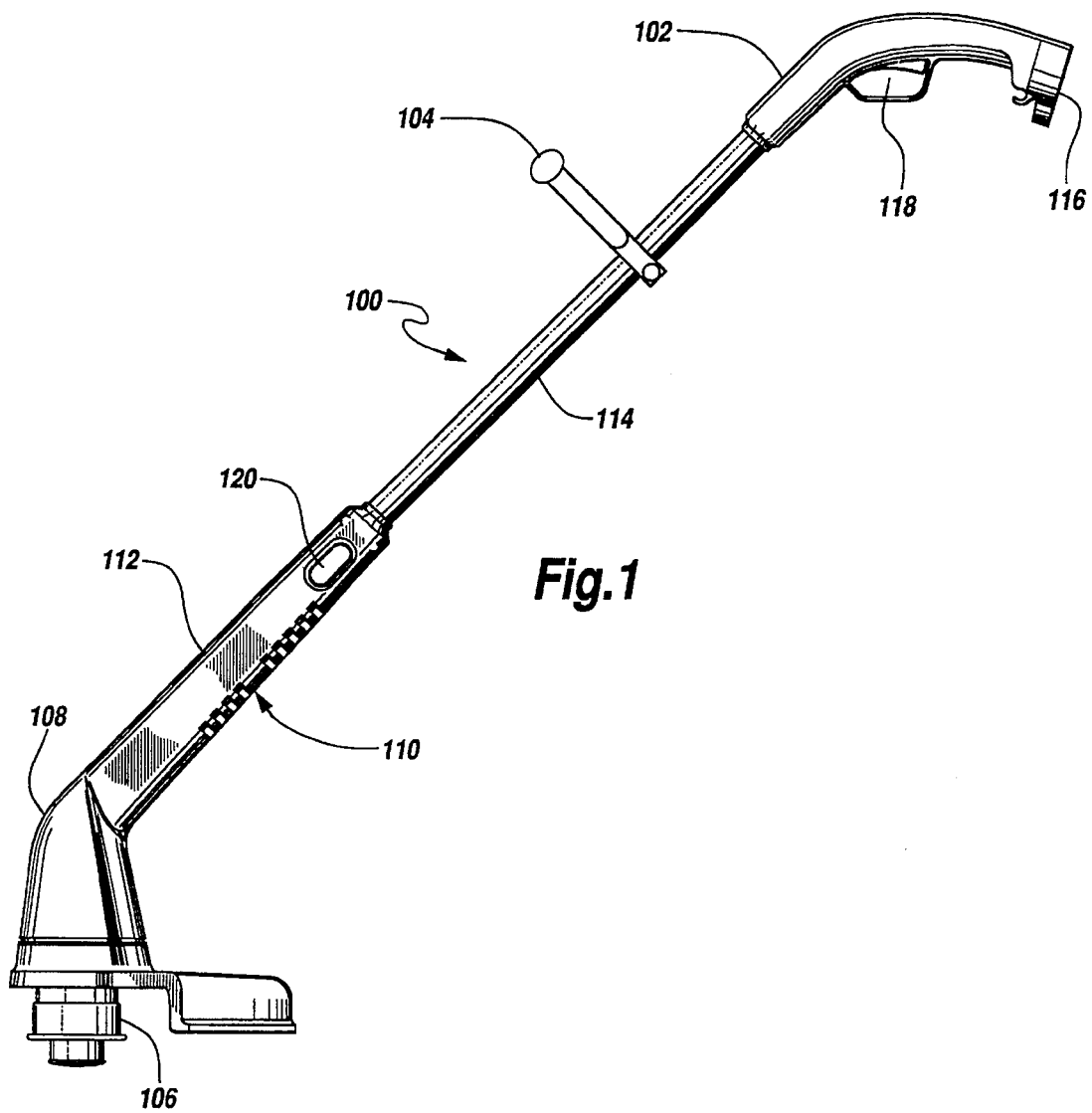
FIG. 1 is a side elevation of a fully assembled line trimmer.

Illustrated in FIG. 1 is a fully-assembled flexible line trimmer 100 oriented in a trimming position. While standing, an operator grasps main handle 102 and auxiliary handle 104 to maneuver a rotating head 106 in close proximity to the ground. Head 106 holds a spool of flexible cutting line for supplying a length of cutting line (not shown) for flailing against ground vegetation by the rapidly spun head. The head is spun by an electric motor that is mounted within portion 108 of an integrally formed motor housing 110. Neck 112 of the housing extends upwardly and rearwardly, generally an angle to the ground plane and toward the operator. Received within neck 112 is a lower end of a handle support tube 114. Main handle 102 is connected to an opposite, top end of the tube 114. The position of the main handle is fixed, but it may be telescoping or rotating if desired. Auxiliary handle 104 is clamped to the tube.

Power is supplied to the line trimmer by connecting an extension cord from a 120 volt wall socket to a male plug (not seen) mounted within at a distal end 116 of main handle 102. The male plug is coupled through a normally open switch (not shown), operated by trigger 118, to the motor by a wire (not shown) that runs through the tube 114 to the motor in housing 110. Pulling trigger 118 supplies current to the motor through the wire, causing the head 106 to rotate at high speeds. Alternatively, a battery can be incorporated with the main handle to supply power to an electric motor in the lower housing. In place of flexible line head 106, other types of cutting elements or work producing elements may be attached to the output shaft of the motor. Also, if well balanced, the trimmers may be operated or controlled effectively using only one hand, without an auxiliary or assist handle.

Referring now to FIGS. 1 and 2 together, button 120 is mounted through an opening in a side surface area of the elongated neck portion 112. The button is located in a position that permits an operator's hand to grip the neck and press the button with either, depending whether it is a left or right hand, the length of the thumb or the tips of several fingers. The button's size is relatively large and its shape is elongated for accommodating the length of the thumb or the tips of several fingers to make pressing the button easier.

Referring now to FIGS. 3 and 4, the housing is formed of halves 110A and 110B screwed together. A plurality of ribs spaced-apart inside housing 110, along neck portion 112, support a lower end of tube 114 substantially within the center of the neck. The ribs in each housing half extend perpendicularly from, respectively, guide channels 124A and 124B and are aligned with corresponding ribs in each housing halve to encircle the tube and laterally support it within the neck.

Detent buttons 126A (not seen in this view) and 126B extend through holes formed through diametrically opposed, but axially displaced, locations of tube 114. The detent buttons are biased outwardly by a spring 128 integrally formed with the buttons for easy manufacture of the trimmer. In their extended positions, the detent buttons cooperate with, respectively, straight guide channels 124A and 124B to prevent twisting of the tube without interfering with linear movement of the tube in the direction of its axis. Within each channel 124A and 124B, there are formed, respectively, ramps 130A and 130B. The ramps depress buttons 126A and 126B as the tube is withdrawn from the neck for release at the end of the ramp into rotational guide channels which prevent the tube from collapsing back into the neck once extended. Located at the end of channel 124B are, respectively, rotational guide channels 132 and 134. Within each rotational guide 132 and 134 is formed, respectively, a ramp 136 and 138.

Walls 139 and 143 define the ends of, respectively, channels 132 and 134. Channels 132 and 134 are each approximately as wide as the detent buttons 126A and 126B and guide the detent buttons during relative rotation of the tube and housing while cooperating to prevent linear movement of the tube within the neck of the housing. At the same time button 126B moves into channel 134, compressed button 126A is released into an opening 140 of an oval shaped collar 141 defined by saddle 142. An underside of saddle 142 includes a portion forming an end 144 of channel 124A and a portion forming an end 146 of ramp 130B, both terminating at opening 140. The underside of the saddle also includes a plurality of ribs 148 for laterally supporting the tube within the neck. The edge of offset surface 149 and the rib 151 define channel 150, which is approximately the width of two detent buttons. On a top side of the saddle is a flange 152 for retaining spring 154 and accommodating radially-inward movement of button 120. Spring 154 biases button 120 to an outward position. Button 120 includes a flange 156 which cooperates with the inside wall of the housing 110A, around opening 158, to retain the button in its outward position. The inside of the housing also includes flange 160 for retaining lateral movement of the button. Button 120 also includes a post 162, part of which extends partially into opening 140 when the button is in its outward position. When button 120 is pushed inwardly, the post pushes detent button 126A or 126B inwardly and out of the opening 140.

FIGS. 5A, 5B and 5C are cross-sections, taken along the axis of tube 114, which illustrate three successive positions of tube 114 as it is being withdrawn from the neck. Several of the ribs 122, which are seen in FIG. 3, have been removed along the channels 124A and 124B for clarity. In FIG. 5A the tube is in a substantially collapsed position for shipping before final assembly by a customer or retailer. Detent buttons 126A and 126B are free to move linearly along, but are otherwise constrained against rotation by guide channels 124A and 124B, respectively. Thus, the tube may be withdrawn but not rotated. In FIG. 5B, the tube has been partially withdrawn from the neck. The detent buttons are being compressed by, respectively, ramps 130A and 130B. Rotation of the tube is still inhibited. In FIG. 5C, the tube is fully extended and snapped into an extended position. When compressed button 126B moves past the end of ramp 130B, it snaps downwardly into channel 132. As the tube continues to be extended, the detent button 126B moves into channel 134 (see FIG. 3) and further extension of the tube is stopped by one of the ribs 122B that forms a side wall of lateral channel 134. Detent button 126A snaps into opening 140 defined by collar 141. The trimmer is now in a trimming configuration: the plane of rotation of the line or cutting is parallel to the surface of the ground when the trimmer is held in the normal operating position.

Referring now to FIG. 6, in the trimming configuration, saddle 142 and detent button 126A cooperate to prevent rotation of tube 114 within neck 112. To rotate the housing 110 on the tube 114 to an edging configuration, in which the plane of spin of the flexible line or other cutting element is perpendicular to the ground when that trimmer is held normally, button 120 is pressed inwardly to release detent button 126A from the saddle. Pushing the button 120 moves post 162 inwardly, which in turn displaces detent button 126A from opening 140. Once the top of the detent button is below the collar, the housing 110 may be manually rotated in a clockwise direction about tube 114, as shown in FIG. 7, toward the edging configuration. Wall 143 assists in preventing further rotation in the counterclockwise direction.

Referring to FIG. 7, as housing 110 is rotated, detent button 126A remains depressed by saddle 142 while detent button 126B is gradually depressed inwardly by ramp 138. Spring 154 (FIG. 5) returns button 120, which is shown in a depressed position, to its normally extended position after it has been released by the operator. The edge of offset surface 149 and rib 151 (FIG. 4), which define channel 150, assist channels 132 and 134 in preventing movement of the tube along its axis as detent button 126A transitions into channel 132 or detent button 126B transitions into channel 150.

Referring to FIG. 8, ramp 136, located behind one of the ribs 122B and thus indicated by dashed lines, gradually releases detent button 126A outwardly. Detent button 126B remains depressed until it reaches opening 140, when it pops into the opening.

Referring to FIG. 9, collar 141 then cooperates with detent button 126B to fix the relative rotational orientation of the housing and tube 114 in an edging configuration in which the housing has been rotated one-hundred, eighty degrees from the trimming configuration. Wall 139, indicated by a dashed line, prevents further clockwise rotation of the housing. To return the trimmer to a trimming configuration, button 120 is pressed to release detent button 126B from engagement with collar 141 and the housing is rotated in a counter-clockwise direction. Confining rotation of the housing through the same one-hundred, eighty degree angle prevents undue twisting of the power cord running through the tube that strains the connections, and possibly detachment, of the wire from the trigger switch in the handle or the motor in the lower housing.

The invention has been described in connection with a preferred embodiment. This description is not intended to limit the scope of the invention to the particular form set forth, but, on the contrary, it is intended to cover such alternatives, modifications and equivalents as may be included within the spirit and scope of the invention as set forth by the appended claims.

What is claimed is:

1. A Lawn trimming and edging apparatus comprising:

an electric motor coupled to a vegetation cutter;

a housing for supporting the motor and the cutter in a fixed spatial relationship with the housing;

a handle;

an elongated tube having a lower end to which is mounted the housing for rotation on the tube and an upper end to which the handle is attached for gripping by an operator to hold the cutter near the ground while standing; and a power cord extending between the handle and the electric motor within the tube;

wherein the housing includes:

means for discretely locking relative rotation of the housing and the tube in one of a plurality of positions, including a first position in which the cutting element is in a trimming orientation or a second position in which the cutting element is in an edging orientation;

a button located on an outside portion of the housing for manually releasing the means for discretely locking to thereby enable relative rotation of the housing and tube between the plurality of positions; and means for limiting relative rotation of the housing and the tube to a fixed angle between the first and second rotational positions.

2. The apparatus of claim 1 wherein the housing includes an extended neck portion adapted to receive a portion of the tube in a collapsed position and allow linear extension of the tube to an operating position and further includes means for holding the tube and the housing against further linear movement when the tube is in the extended operating position.

3. The apparatus of claim 2 wherein the housing further includes means for guiding withdrawal of the tube from the collapsed position to the extended operating position and for preventing relative rotation of the tube and the housing during the withdrawal.

4. An apparatus comprising:

an electric motor coupled to a vegetation cutter;

a housing for supporting the motor and the vegetation cutter in a fixed spatial orientation with respect to the housing;

a handle;

an elongated tube having a lower end to which is mounted the housing for rotation on the tube and an upper end to which the handle is attached for gripping by an operator holding the cutter near the ground while standing; and a power cord extending between the handle and the electric motor;

wherein the housing includes a manually depressible button located on an outside surface of the housing for releasing a first resilient member extending radially from the tube from an engaging position with the housing when the tube and the housing are in a first orientation, and for releasing a second resilient member extending radially from the tube from the engaging position with the housing when the housing and the tube are in a second orientation.

5. The apparatus of claim 4 wherein the first resilient member follows a rotational guide formed inside the housing for stopping relative linear movement of the tube and the housing while the housing is being rotated between the first and second orientations.

6. The apparatus of claim 5 wherein the rotational guide terminates at one end with the engaging position with the housing and terminates at an opposite end with a stop for cooperating with the first resilient member to limit relative rotation of the tube and housing to a fixed angle between the first and second orientations.

7. The apparatus of claim 6 wherein the channel includes a ramp for depressing the first resilient member radially inwardly and releasing it into the engaging position with the housing as the tube is rotated from the second orientation to the first orientation.

8. The apparatus of claim 5 wherein the housing includes a neck for receiving a substantial portion of the tube in a collapsed position and a linear guide which the first resilient member follows while the tube is being withdrawn from the housing for stopping relative rotation of the housing and the tube during withdrawal.

9. The apparatus of claim 8 wherein the linear guide includes a ramp for depressing the first resilient member radially inwardly and releasing it into the rotational channel.

10. The apparatus of claim 4 wherein the manually depressible button is oversized for accommodating tips of a plurality of fingers.

11. A lawn trimming and edging apparatus comprising:

an electric motor coupled to a vegetation cutter;

a housing for supporting the motor and the vegetation cutter in a fixed spatial orientation with respect to the housing;

a handle;

an elongated tube having a lower end to which is mounted the housing for rotation on the tube and an upper end to which the handle is attached for gripping by an operator holding the cutter near the ground while standing; and a power cord extending between the handle and the electric motor;

wherein the housing includes, a manually depressible button located on an outside surface of the housing for releasing a first resilient member extending radially from the tube from an engaging position with the housing when the tube and the housing are in a first orientation, and for releasing a second resilient member extending radially from the tube from the engaging position with the housing when the housing and the tube are in a second orientation, and first and second rotational guides lying within respective first and second parallel planes oriented perpendicularly to the center axis of the tube, the first member following the first guide for restraining linear movement of the tube and the second member following the second guide for restraining linear movement of the tube during relative rotation of the tube and housing.

12. The apparatus of claim 11 wherein each rotational guide terminates at one end in the engaging position and at an opposite end with a wall for limiting relative rotation of the tube and the housing to within a fixed angle.

13. The apparatus of claim 12 wherein each rotational guide includes a ramp for depressing the respective resilient member as the member is being rotated from a non-engaging position with the housing toward the engaging position, and releasing the member for extension into the engaging position.

14. The apparatus of claim 11 wherein the housing includes a neck for receiving a substantial portion of the tube in a collapsed position and first and second linear guides which the first and second resilient members respectively follow while the tube is being withdrawn from the housing for preventing relative rotation of the tube and housing during withdrawal.

15. The apparatus of claim 14 wherein the first and second linear guides each includes a ramp for depressing the respective resilient member as the tube is being withdrawn and releasing the first resilient member into the engaging position with the housing and the second resilient member into the second rotational guide.

* * * * *